United States Patent [19]

Toyoda et al.

[11] Patent Number: 5,564,534
[45] Date of Patent: Oct. 15, 1996

[54] LINK BETWEEN A MOTORCYCLE BRAKE CALIPER AND A MASTER CYLINDER

[75] Inventors: Hidetoshi Toyoda; Tetsuo Tsuchida, both of Saitama, Japan

[73] Assignee: Honda Giken Kogyo Kabushiki Kaisha, Tokyo, Japan

[21] Appl. No.: 239,514

[22] Filed: May 9, 1994

[30] Foreign Application Priority Data

May 10, 1993 [JP] Japan ................... 5-107832

[51] Int. Cl.⁶ ................................................. B62L 3/08
[52] U.S. Cl. ................... 188/345; 303/9.64; 303/DIG. 2; 188/106 P
[58] Field of Search .................. 303/9.64, 6.01, 303/113.5, 115.6; 188/344, 345, 106 P; 180/219; 280/703

[56] References Cited

U.S. PATENT DOCUMENTS

| | | | |
|---|---|---|---|
| 4,703,839 | 11/1987 | Nakano et al. | 188/344 X |
| 4,723,638 | 2/1988 | Tsuchida | 188/344 X |
| 5,219,211 | 6/1993 | Tsuchida et al. | 303/9.64 |
| 5,273,346 | 12/1993 | Tsuchida et al. | 303/2 |

FOREIGN PATENT DOCUMENTS

| | | | |
|---|---|---|---|
| 559224 | 9/1993 | European Pat. Off. | 303/9.64 |
| 0090857 | 4/1989 | Japan | 188/344 |
| 3-120286 | 12/1991 | Japan . | |

*Primary Examiner*—Josie Ballato
*Attorney, Agent, or Firm*—Birch, Stewart, Kolasch & Birch, LLP

[57] ABSTRACT

Links are provided for linking a brake caliper pivotally supported through a pin to a vehicle body. A master cylinder is fixed to the vehicle body and is constructed of a first link having one end pivotally supported through a pin to the brake caliper and the other end pivotally supported through a pin to an input member of the master cylinder. A second link is provided having one end pivotally supported through a pin to the vehicle body and the other end pivotally supported through a pin to the first link at an intermediate portion thereof. When the brake caliper is swung in a first direction by a brake reaction force received from a brake disc, the input member is upwardly driven through the first link and the second link, and the master cylinder is operated to generate a secondary brake hydraulic pressure.

20 Claims, 6 Drawing Sheets

LINK BETWEEN A MOTORCYCLE BRAKE CALIPER AND A MASTER CYLINDER

BACKGROUND OF THE INVENTION

1. Field of the Invention

The present invention relates to a brake for a motorcycle, and more particularly to a brake for a motorcycle provided with a master cylinder linked to a brake caliper pivotally supported on a body of the motorcycle for generating a secondary brake hydraulic pressure.

2. Description of the Background Art

A brake for a motorcycle is known from Japanese Utility Model Laid-open No. Hei 3-120286. This conventional brake has a structure such that a master cylinder is integrally provided on a brake caliper pivotally supported on a vehicle body, and an input member of the master cylinder is connected to the vehicle body. Accordingly, when the brake caliper is swung by a reaction force received from a brake disc upon braking, the input member is relatively forced into the master cylinder to thereby generate a secondary brake hydraulic pressure.

SUMMARY AND OBJECTS OF THE INVENTION

In the above conventional brake, the input member of the master cylinder is connected directly to the vehicle body. Accordingly, a brake reaction force to be transmitted from the brake caliper to the master cylinder and a stroke of the master cylinder cannot be freely set. The degree of freedom of design is low.

It is, therefore, an object of the present invention to provide a brake for a motorcycle in which the brake reaction force to be transmitted from the brake caliper to the master cylinder and the stroke of the master cylinder can be arbitrarily set.

According to the present invention, a brake for a motorcycle is provided which includes a brake disc rotating with a wheel, a brake caliper pivotally supported on a body of said motorcycle, for holding said brake disc, a master cylinder fixed to said body, for generating a secondary brake hydraulic pressure, and linking means for transmitting a pivotal motion of said brake caliper to an input member of said master cylinder; wherein said linking means comprises a first link having one end pivotally supported to said brake caliper and the other end pivotally supported to said input member, and a second link having one end pivotally supported to said body and the other end pivotally supported to said first link.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

PREFERRED EMBODIMENTS OF THE INVENTION

A preferred embodiment of the present invention will now be described with reference to the drawings.

Figure 1:
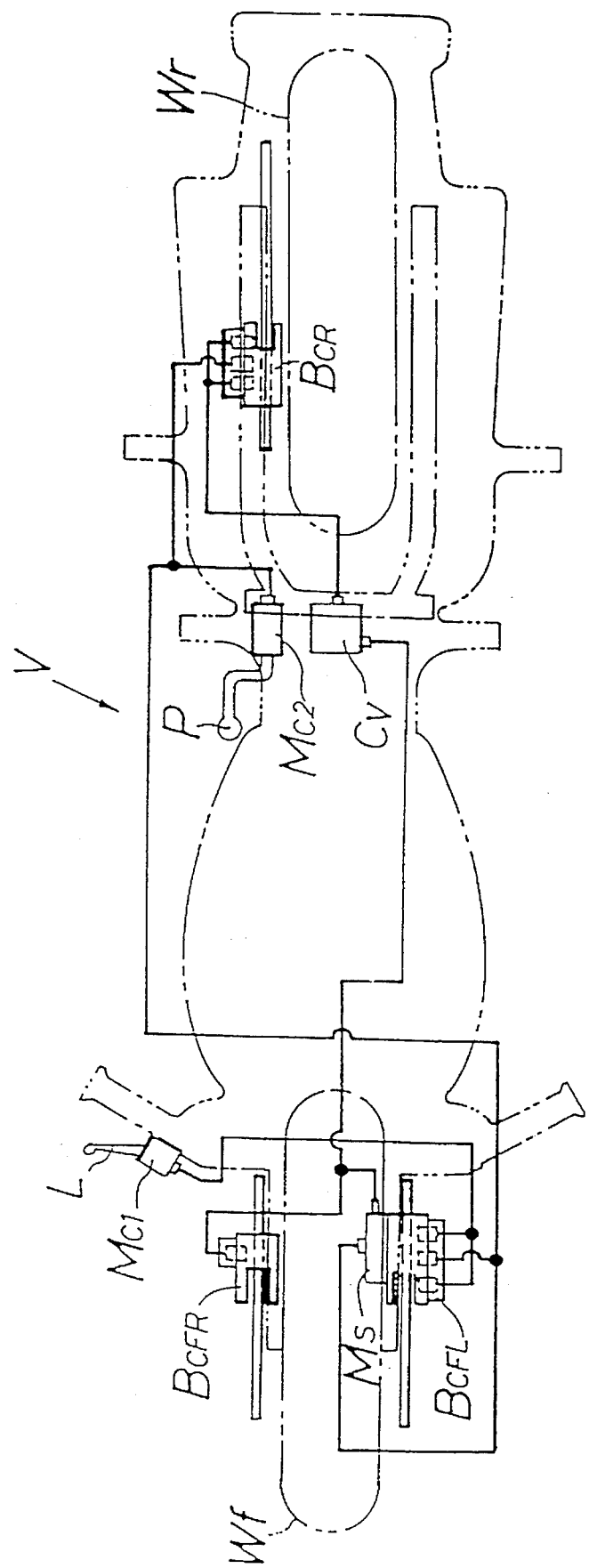
FIG. 1 is a plan view of a motorcycle provided with a brake.
Figure 2:
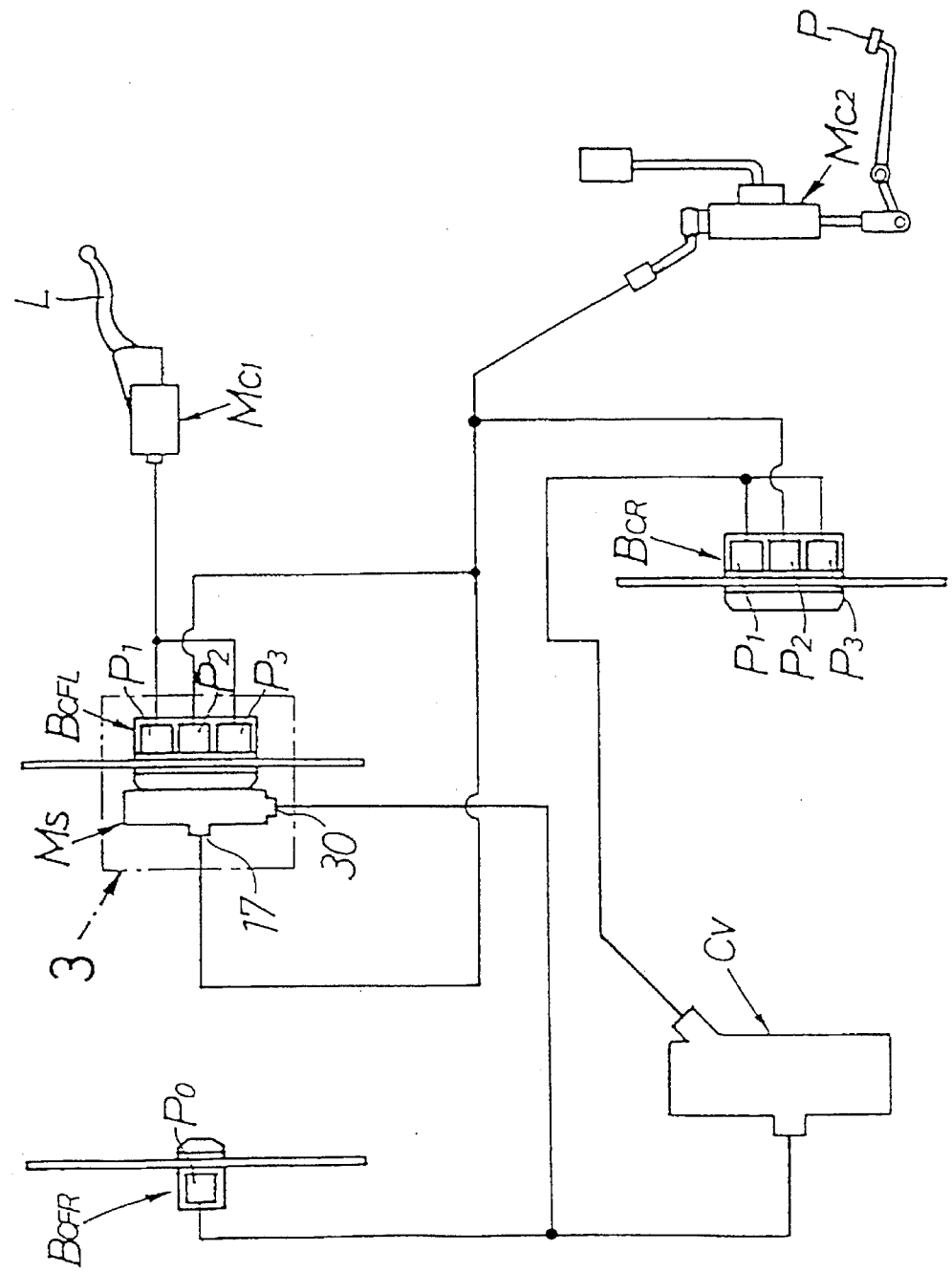
FIG. 2 is a diagram showing the whole construction of the brake.

FIGS. 1 to 6 show a preferred embodiment of the present invention. As illustrated in FIGS. 1 and 2, a motorcycle V is provided with a brake lever L mounted on a steering handle and a brake pedal P mounted on a vehicle frame. A front wheel Wf is provided with left and right brake calipers $B_{CFL}$ and $B_{CFR}$. The right brake caliper $B_{CFR}$ is provided with a single port $P_0$, and the left brake caliper $B_{CFL}$ is provided with three ports, i.e., a front port $P_1$, a central port $P_2$, and a rear port $P_3$. A rear wheel Wr is provided with a brake caliper $B_{CR}$. The brake caliper $B_{CR}$ is provided with three ports, i.e., a front port $P_1$, a central port $P_2$, and a rear port $P_3$.

A first master cylinder $M_{C1}$ is operated by the brake lever L which is directly connected to the front port $P_1$ and the rear port $P_3$ of the left brake caliper $B_{CFL}$ of the front wheel Wf. A mechanical servo mechanism Ms acts as a master cylinder for generating a secondary brake hydraulic pressure by utilizing a braking force on the front wheel Wf. The mechanical servo mechanism Ms is mounted on the left brake caliper $B_{CFL}$. The brake hydraulic pressure generated by the mechanical servo mechanism Ms is transmitted to the port $P_0$ of the right brake caliper $B_{CFR}$ of the front wheel Wf, and is also transmitted through a pressure control valve Cv to the front port $P_1$ and the rear port $P_3$ of the brake caliper $B_{CR}$ of the rear wheel Wr.

A second master cylinder $M_{C2}$ is operated by the brake pedal P connected to the central port $P_2$ of the left brake caliper $B_{CFL}$ of the front wheel Wf and the central port $P_2$ of the brake caliper $B_{CR}$ of the rear wheel Wr. The second master cylinder $M_{C2}$ is also connected to the mechanical servo mechanism Ms.

Figure 3:
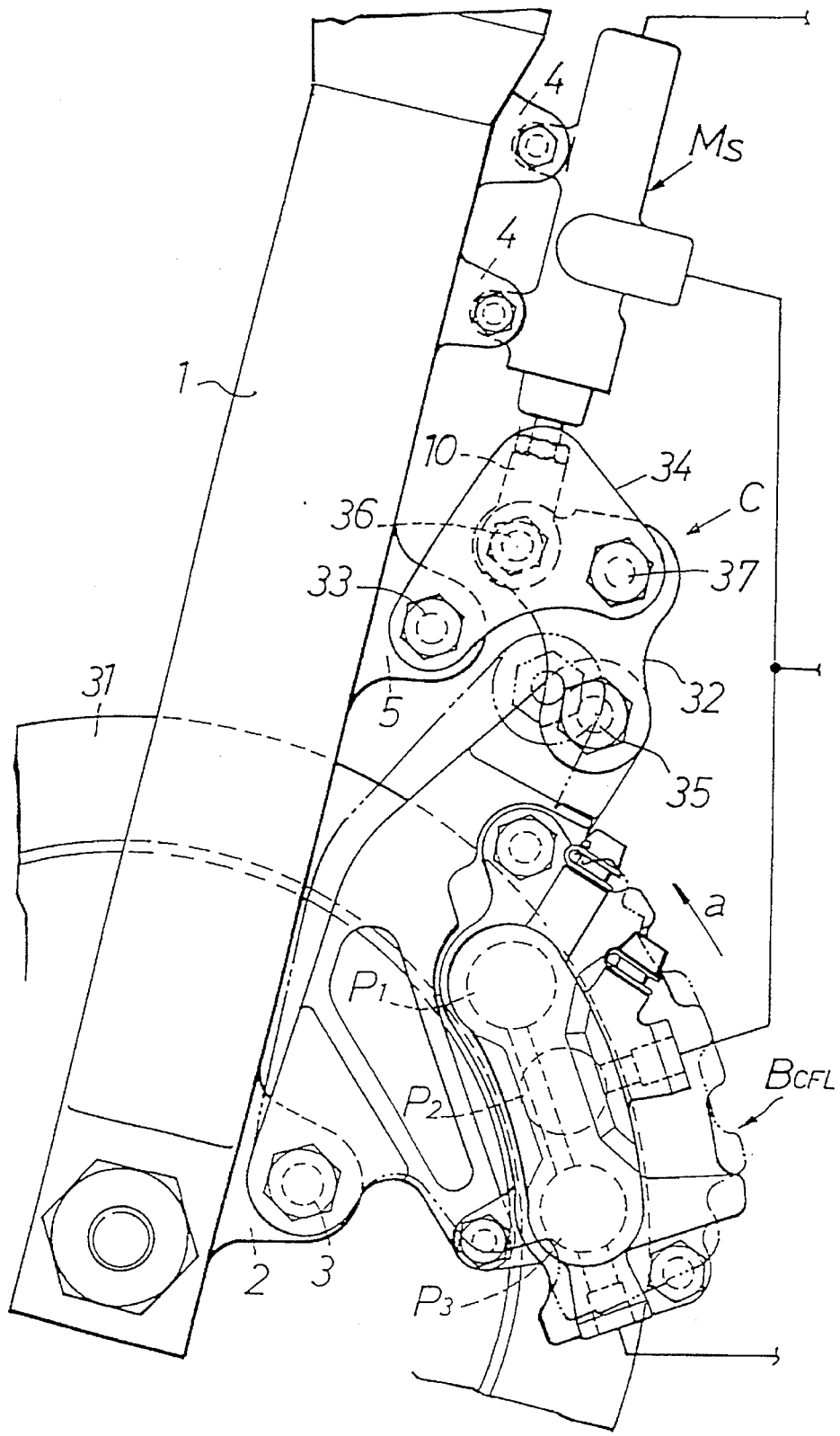
FIG. 3 is an enlarged view of the elements referred to by numeral 3 illustrated in FIG. 2.

As shown in FIG. 3, the left brake caliper $B_{CFL}$ is provided for holding a brake disc 31 on the front wheel Wf. The left brake caliper $B_{CFL}$ is pivotally supported through a pin 3 to a bracket 2 fixed to a lower portion of a front fork 1. The mechanical servo mechanism Ms is constructed in a substantially cylindrical shape and is vertically supported through a pair of brackets 4 fixed to an upper portion of the front fork 1.

A second link 34 having a substantially triangular shape is pivotally supported at one end thereof through a pin 33 to a bracket 5 fixed to the front fork 1. A first link 32 is constructed in a substantially L-shaped configuration and is pivotally supported at one end thereof through a pin 35 to an upper end of the brake caliper $B_{CFL}$. The other end of the first link 32 is pivotally supported through a pin 36 to an input member 10 of the mechanical servo mechanism Ms. The other end of the second link 34 is pivotally supported through a pin 37 to an intermediate portion of the first link 32. The first link 32 and the second link 34 constitute the linking means C according to the present invention. Even if the shape of the second link 34 is rectilinear so as to connect the pins 33 and 37 together, the same operation as that of the triangular second link 34 may be obtained. However, the triangular shape of the second link 34 has an advantage such that it can cover the outside of the input member 10 of the mechanical servo mechanism Ms to protect the input member 10 from bouncing debris such as stones or the like.

When the front wheel Wf is braked, the brake caliper $B_{CFL}$ is swung from a solid line position to a dot-dash line position in a direction of arrow "a" by a reaction force from the brake disc 31. Accordingly, the input member 10 is raised by the first link 32 and the second link 34 of the linking means C, so that a secondary brake hydraulic pressure is generated in the mechanical servo mechanism Ms.

Figure 4:
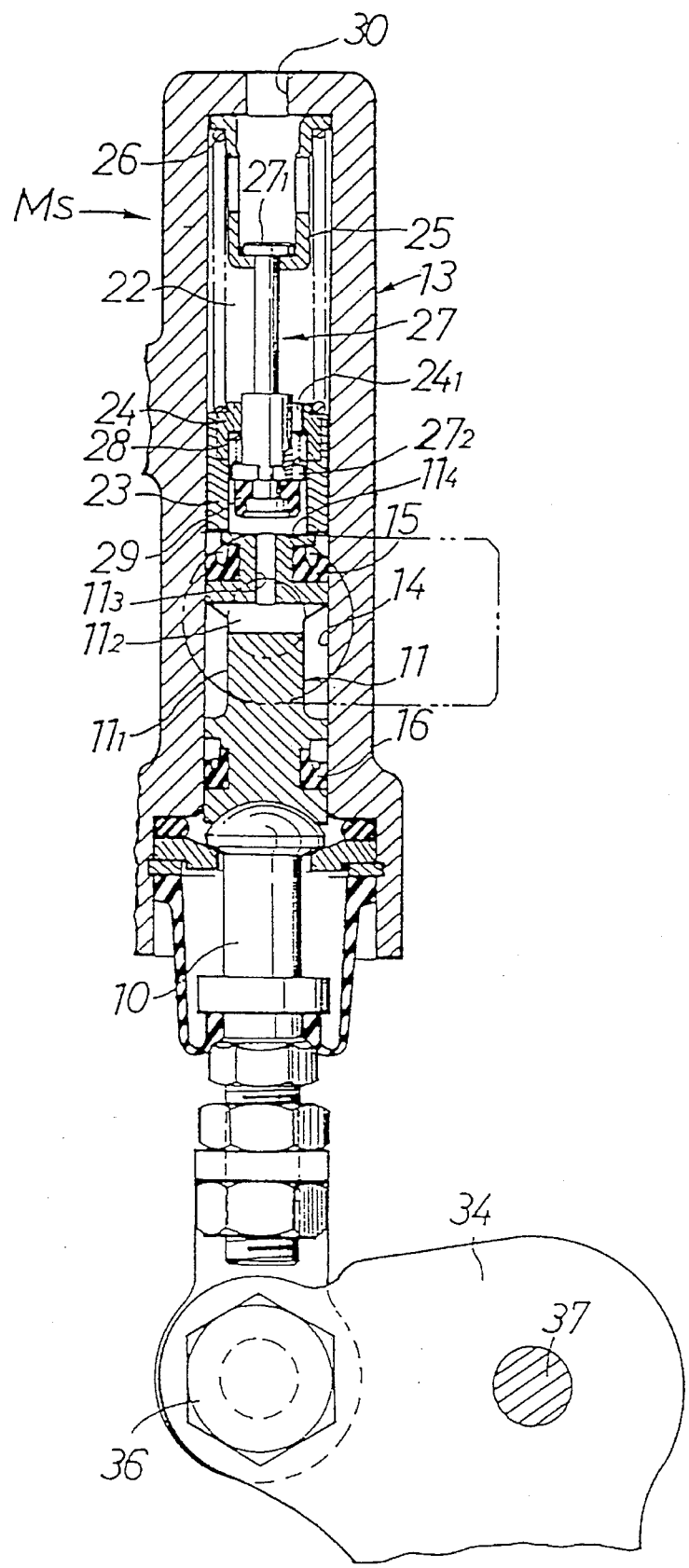
FIG. 4 is an enlarged sectional view of an essential element shown in FIG. 3.
Figure 5:
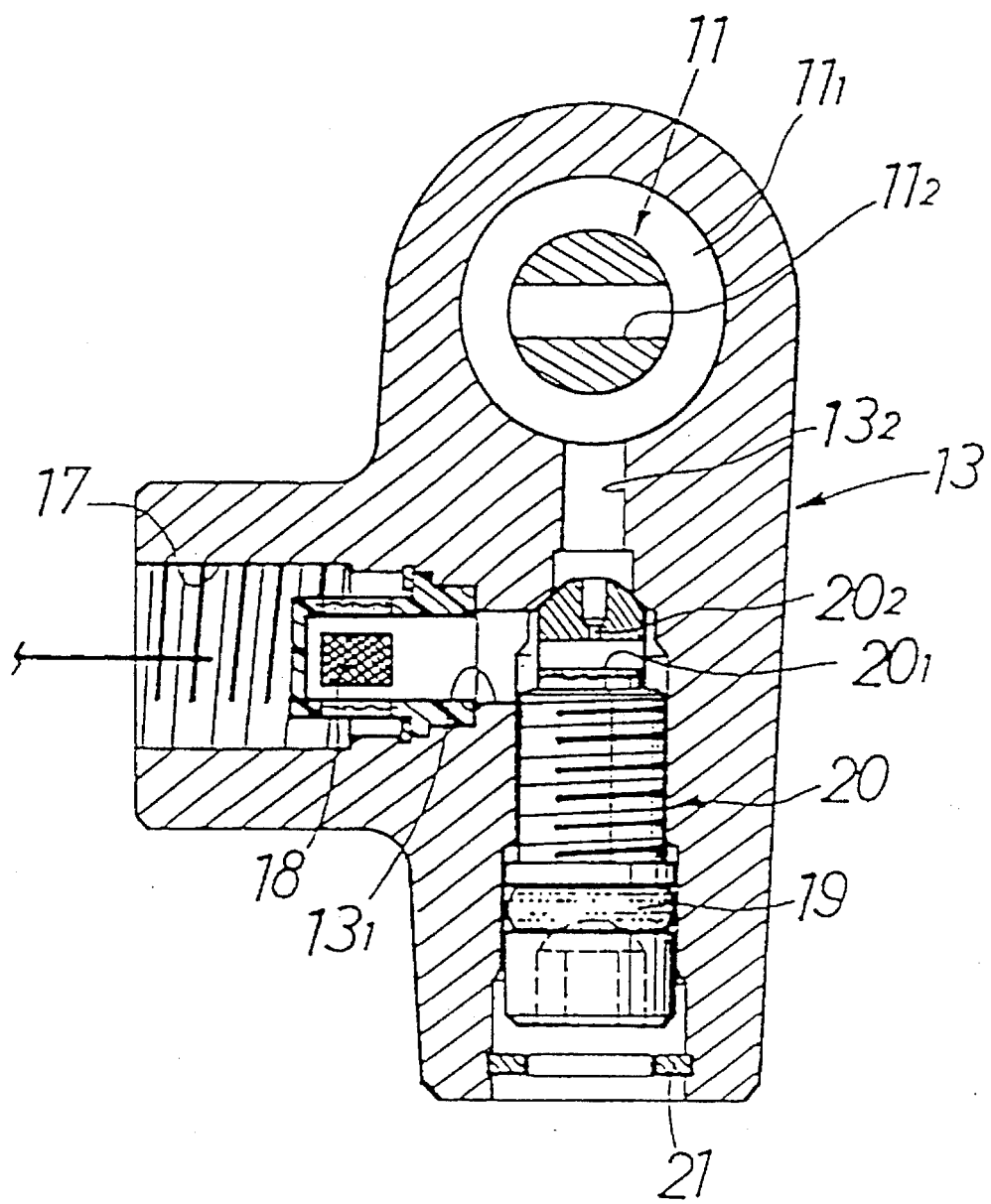
FIG. 5 is a cross section taken along the central portion of FIG. 4.

As is apparent from FIGS. 4 and 5, a casing 13 of the mechanical servo mechanism Ms is formed with a cylinder 14 in which a piston 11 is slidably engaged. A primary cup 15 and a secondary cup 16 are mounted on the piston 11 at an upper end portion and a lower end portion thereof, respectively. An annular oil groove $11_1$ is formed on the outer circumference of the piston 11 between the primary cup 15 and the secondary cup 16. The annular oil groove $11_1$ communicates with oil passages $11_2$ and $11_3$ to open to a valve seat $11_4$ formed on the upper surface of the piston 11.

An input port 17 is connected to the second master cylinder $M_{C2}$ and is formed at a side portion of the casing 13. The input port 17 communicates through a mesh filter 18 and oil passages $13_1$ and $13_2$ to the oil groove $11_1$ of the piston 11. An orifice bolt 20 having an outer circumference on which an O-ring 19 is mounted is threadedly inserted in the casing 13 in a direction intersecting an axial direction of the input port 17, and is prevented from escaping by a clip 21. An oil passage $20_1$ is formed at a tip portion of the orifice bolt 20 so as to extend in a diametrical direction thereof, and an orifice $20_2$ is formed at the center of the oil passage $20_1$ so as to communicate with the oil passage $13_2$. Accordingly, the input port 17 communicates with the mesh filter 18, the oil passage $13_1$ of the casing 13, the oil passage $20_1$ of the orifice bolt 20, the orifice $20_2$ of the orifice bolt 20, and the oil passage $13_2$ of the casing 13 to the oil groove $11_1$ of the piston 11, further communicating through the oil passages $11_2$ and $11_3$ of the piston 11 to the valve seat $11_4$ of the piston 11.

A first valve guide 23 and a second valve guide 24 both having an annular shape are engaged together and slidably retained in an oil chamber 22 formed at an upper portion of the cylinder 14. A third valve guide 25 is provided at an upper end of the cylinder 14. A return spring 26 is interposed under compression between the assembly of the first and second valve guides 23 and 24 and the third valve guide 25. Accordingly, the assembly of the first and second valve guides 23 and 24 is biased downwardly by the return spring 26 in such a direction that a lower end of the first valve guide 23 abuts against the upper surface of the piston 11. A valve 27 is slidably retained relative to the first, second, and third valve guides 23, 24, and 25. A valve spring 28 is interposed under compression between the second valve guide 24 and the valve 27. Accordingly, the valve 27 is biased downward by the valve spring 28 in such a direction that a valve head 29 is provided at a lower end of the valve 27 which abuts against the valve seat 114 of the piston 11.

In an inoperative condition of the mechanical servo mechanism Ms as shown in FIG. 4, a flange $27_2$ formed at an upper end of the valve 27 is stopped by the third valve guide 25, and the valve head 29 of the valve 27 is therefore separate from the valve seat $11_4$ of the piston 11. At this time, the oil passage $11_3$ of the piston 11 opening to the valve seat $11_4$ communicates with the oil chamber 22 through a plurality of recesses $27_2$ formed on the outer circumference of the valve 27 and a plurality of recesses $24_1$ formed on the inner circumference of the second valve guide 24. The oil chamber 22 communicates through an output port 30 to the right brake caliper $B_{CFR}$ of the front wheel Wf and the pressure control valve Cv.

The operation of the preferred embodiment having the above construction will now be described.

When the brake lever L is operated, a brake hydraulic pressure is generated from the first master cylinder and is transmitted to the ports $P_1$ and $P_3$ of the left brake caliper $B_{CFL}$ of the front wheel Wf, thereby braking the front wheel Wf. As a result, the brake caliper $B_{CFL}$ receives a brake reaction force from the brake disc 31 and is swung in the direction of arrow "a" shown in FIG. 3. The swinging motion of the brake caliper $B_{CFL}$ is transmitted through the linking means C to the input member 10 of the mechanical servo mechanism Ms.

Figure 6:
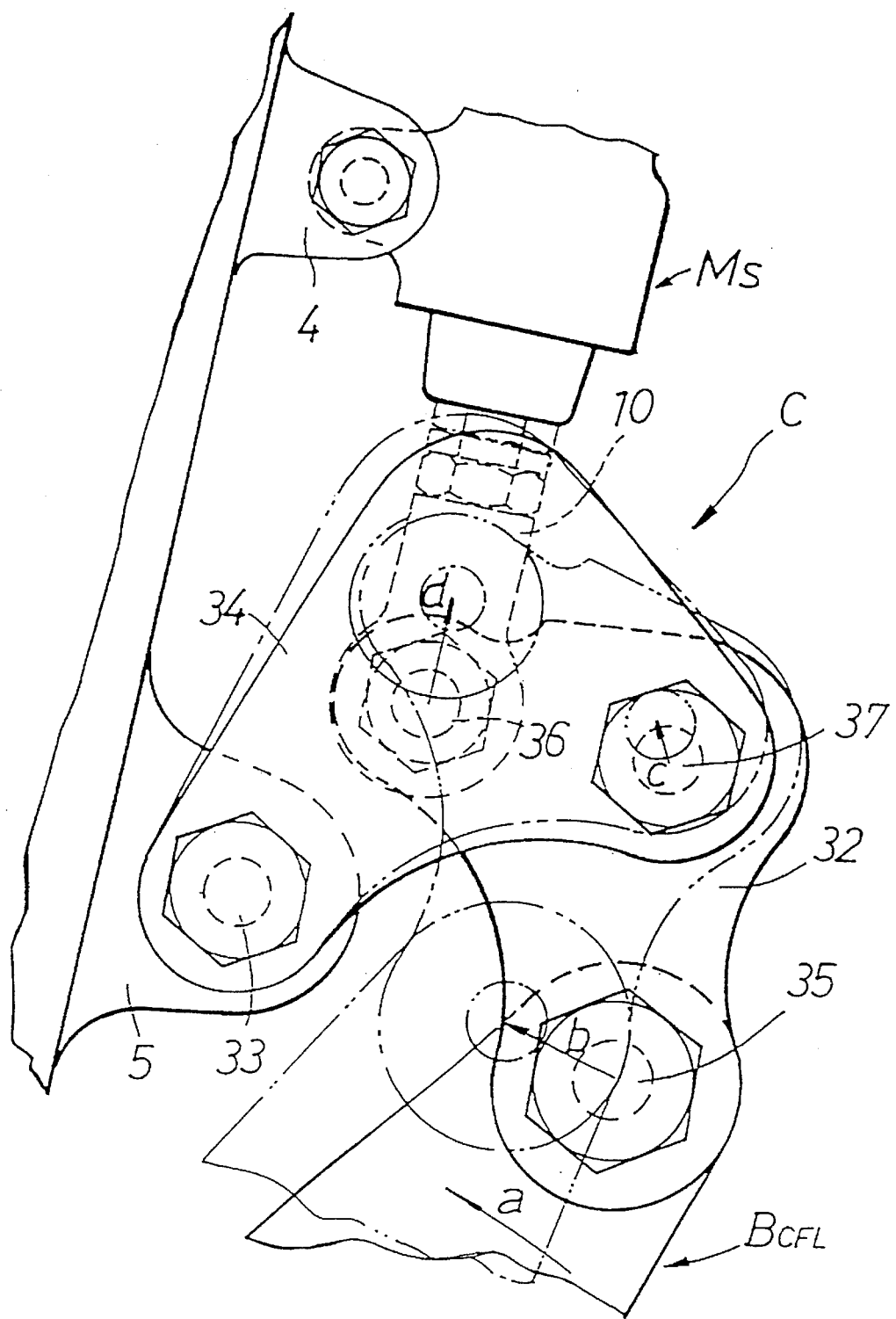
FIG. 6 is a view illustrating the operation of the brake.

More specifically, when the brake caliper $B_{CFL}$ is swung in the direction of arrow "a" as shown in FIG. 6, the position of the pin 35 is moved in a direction of arrow "b" to force the lower portion of the first link 32 in the frontward direction of the vehicle. The second link 34 is allowed to swing about the pin 33 only swingably supporting the second link 34 to the bracket 6. Accordingly, the second link 34 is swung from a solid line position to a dot-dash line position by a load transmitted from the first link 32 through the pin 37 to the second link 34, and the position of the pin 37 is moved in a direction of arrow "c." Such movements of the pins 35 and 37 cause a swinging motion of the first link 32 from a solid line position to a dot-dash line position. Accordingly, the position of the pin 36 is moved in a direction of arrow "d." As a result, the input member 10 of the mechanical servo mechanism Ms is raised according to an amount of swinging of the brake caliper $B_{CFL}$.

The ratio of a load to be transmitted from the brake caliper $B_{CFL}$ to the input member 10, that is, the ratio of a load to be applied to the pin 36 of the input member 10 of the mechanical servo mechanism Ms to a load to be applied to the pin 35 of the brake caliper $B_{CFL}$ changes from about 0.9 to about 0.7 with a change in the stroke of the input member 10 of the mechanical servo mechanism Ms from 0 mm to 10 mm. The above ratio can be arbitrarily set by changing the positions of the pins 33, 35, 36, and 37. Similarly, the stroke of the input member 10 according to the amount of swing of the brake caliper $B_{CFL}$ can be arbitrarily set by changing the positions of the pins 33, 35, 36, and 37. In this manner, the output characteristics of the mechanical servo mechanism Ms can be freely changed with the simple structure of the linking means C constructed of the first link 32 and the second link 34.

When the input member 10 of the mechanical servo mechanism Ms is thus raised through the linking means C, the piston 11 is advanced upward in the cylinder 14 against the return spring 26. Immediately thereafter, the valve seat $11_4$ formed on the upper surface of the piston 11 comes into abutment against the valve head 29 provided at the lower end of the valve 27, thereby cutting off the communication between the input port 17 and the oil chamber 22. When the piston 11 is further advanced, a secondary brake hydraulic pressure is generated in the oil chamber 22 according to the amount of advance of the piston 11. The brake hydraulic pressure is transmitted from the output port 30 to the port $P_0$ of the right brake caliper $B_{CFR}$ of the front wheel Wf, and is also transmitted through the pressure control valve Cv to the ports $P_1$ and $P_3$ of the brake caliper $B_{CR}$ of the rear wheel Wr.

On the other hand, when the brake pedal P is operated, a brake hydraulic pressure is generated from the second master cylinder $M_{C2}$ and is transmitted to the central port $P_2$ of the brake caliper $B_{CR}$ of the rear wheel Wr, the central port $P_2$ of the left brake caliper $B_{CFL}$ of the front wheel Wf, and the input port 17 of the mechanical servo mechanism Ms. Then, the mechanical servo mechanism Ms is operated by the operation of the left brake caliper $B_{CFL}$ of the front wheel Wf in the same manner as the above, and a secondary brake hydraulic pressure generated in the mechanical servo mechanism Ms is transmitted from the output port 30 to the right brake caliper $B_{CFR}$ of the front wheel Wf and the pressure control valve Cv.

The brake hydraulic pressure transmitted to the input port 17 of the mechanical servo mechanism Ms is transmitted through the mesh filter 18, the oil passage $13_1$ of the casing 13, the oil passage $20_1$ of the orifice bolt 20, the orifice $20_2$ of the orifice bolt 20, the oil passage $13_2$ of the casing 13, the oil groove $11_1$ of the piston 11, and the oil passages $11_2$ and $11_3$ of the piston 11 to the valve seat $11_4$ of the piston 11. If the brake hydraulic pressure transmitted from the input port 17 to the valve seat $11_4$ if the piston 11 is greater than the brake hydraulic pressure generated in the oil chamber 22 by the operation of the mechanical servo mechanism Ms, the valve head 29 is separated from the valve seat $11_4$ against the valve spring 28. As a result, the brake hydraulic pressure transmitted from the input port 17 to the valve seat $11_4$ of the piston 11 is transmitted through the recesses $27_2$ of the valve 27, the recesses $24_1$ of the second valve guide 24, and the oil chamber 22 to the output port 30. Thereafter, the brake hydraulic pressure is transmitted from the output port 30 to the right brake caliper $B_{CFR}$ of the front wheel Wf and the pressure control valve Cv. In other words, when the second master cylinder $M_{C2}$ is operated, the greater of the secondary brake hydraulic pressure generated by the mechanical servo mechanism and the brake hydraulic pressure transmitted from the second master cylinder $M_{C2}$ to the input port 17 of the mechanical servo mechanism Ms is selected and is transmitted to the output port 30.

If the brake hydraulic pressure generated by the mechanical servo mechanism Ms competes with the brake hydraulic pressure transmitted from the second master cylinder $M_{C2}$ to the input port 17, the valve 27 is intermittently opened and closed to possibly generate vibration in an auxiliary oil passage connecting the second master cylinder $M_{C2}$ to the input port 17 of the mechanical servo mechanism Ms. According to the present invention, however, the orifice $20_2$ formed in the orifice bolt 20 connected to the auxiliary oil passage functions to damp the vibration in the auxiliary oil passage due to the intermittent opening and closing of the valve 27, thereby avoiding a deterioration in the feel of the brake.

While a specific embodiment of the present invention has been described, it is to be appreciated that the present invention is not limited to the above preferred embodiment, but various modifications in design may be made.

As described above, according to the present invention, the linking means for transmitting a swinging motion of the brake caliper to the input member of the master cylinder is constructed with the first link having one end pivotally supported on the brake caliper and the other end pivotally supported on the input member and of the second link having one end pivotally supported on a vehicle body and the other end pivotally supported on the first link. Accordingly, the ratio of a load to be transmitted from the brake caliper to the input member and the stroke of the input member can be arbitrarily set with a simple structure.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A brake for a motorcycle comprising:
   a brake disc operatively affixed for rotation with a wheel;
   a brake caliper pivotally supported relative to a support, said brake caliper being selectively actuated for engaging said brake disc;
   a master cylinder for generating a brake hydraulic pressure; and
   linking means for transmitting a pivotal motion of said brake caliper to an input member of said master cylinder;
   said linking means comprising a first link having one end pivotally supported relative to said brake caliper and the other end pivotally supported relative to said input member, and a second link having one end pivotally supported relative to said support and the other end pivotally supported relative to a central portion of said first link.

2. The brake for a motorcycle according to claim 1, wherein said brake caliper is pivotally supported relative to said support for limited pivotal movement relative to said support in a first direction when said brake caliper engages said brake disc during a braking action.

3. The brake for a motorcycle according to claim 2, wherein said input member of said master cylinder is slidably mounted within said master cylinder and said limited pivotal movement of said brake caliper imparts movement to said first link pivotally supported relative to said brake caliper for imparting a reciprocal movement to said input member.

4. The brake for a motorcycle according to claim 1, wherein said master cylinder includes a chamber with a piston operatively mounted for reciprocation within said chamber, a valve being operatively disposed relative to said piston, a hydraulic chamber being positioned within said master cylinder for containing hydraulic fluid, whereby imparting movement to said piston closes said valve for generating said brake hydraulic pressure which is supplied to a second brake caliper for selectively engaging said brake disc.

5. The brake for a motorcycle according to claim 4, and further including a second master cylinder being manually operated for applying a braking action to said brake caliper pivotally supported relative to said frame and to a third brake caliper operatively positioned relative to a second brake disc.

6. The brake for a motorcycle according to claim 5, wherein the brake hydraulic pressure is in communication with said third brake caliper and the greater of the brake hydraulic pressure or a pressure produced by the manually actuated second master cylinder is applied to said third brake caliper.

7. The brake for a motorcycle according to claim 5, and further including an orifice in fluid communication with hydraulic fluid supplied from the manual actuation of said second master cylinder for damping vibrations due to opening and closing of the valve.

8. The brake for a motorcycle according to claim 4, and further including first, second and third valve guides for guiding the movement of said valve within said master cylinder.

9. The brake for a motorcycle according to claim 8, and further including a spring for biasing said first and second valve guides to a position for normally maintaining said valve in an open condition.

10. The brake for a motorcycle according to claim 1, wherein said first link and said second link are substantially triangular in shape.

11. A brake for a motorcycle comprising:

a brake disc operatively affixed for rotation with a wheel;

a brake caliper pivotally supported relative to a support, said brake caliper being selectively actuated for engaging said brake disc;

a first master cylinder being manually actuated for supplying hydraulic pressure to said brake caliper;

a second master cylinder fixed to a support for generating a secondary brake hydraulic pressure; and linking means for transmitting a pivotal motion of said brake caliper to an input member of said second master cylinder for supplying secondary brake hydraulic pressure to said brake caliper;

said linking means comprising a first link having one end pivotally supported relative to said brake caliper and the other end pivotally supported relative to said input member, and a second link having one end pivotally supported relative to said support and the other end pivotally supported relative to a central portion of said first link.

12. The brake for a motorcycle according to claim 11, wherein said brake caliper is pivotally supported relative to said frame of said motorcycle for limited pivotal movement relative to said frame in a first direction when said brake caliper engages said brake disc during a braking action of said motorcycle.

13. The brake for a motorcycle according to claim 12, wherein said input member of said second master cylinder is slidably mounted within said second master cylinder and said limited pivotal movement of said brake caliper imparts movement to said first link pivotally supported relative to said brake caliper for imparting a reciprocal movement to said input member.

14. The brake for a motorcycle according to claim 11, wherein said second master cylinder includes a chamber with a piston operatively mounted for reciprocation within said chamber, a valve being operatively disposed relative to said piston, a hydraulic chamber being positioned within said second master cylinder for containing hydraulic fluid, whereby imparting movement to said piston closes said valve for generating said secondary brake hydraulic pressure which is supplied to a second brake caliper for selectively engaging said brake disc.

15. The brake for a motorcycle according to claim 14, and further including a third master cylinder being manually operated for applying a braking force to said brake caliper pivotally supported relative to said frame and to a third brake caliper operatively positioned relative to a second brake disc.

16. The brake for a motorcycle according to claim 15, wherein the secondary brake hydraulic pressure is in communication with said third brake caliper and the greater of the secondary brake hydraulic pressure or a pressure produced by the manually actuated third master cylinder is applied to said third brake caliper.

17. The brake for a motorcycle according to claim 15, and further including an orifice in fluid communication with fluid supplied from the manual actuation of said third master cylinder for damping vibrations due to opening and closing of the valve.

18. The brake for a motorcycle according to claim 14, and further including first, second and third valve guides for guiding the movement of said valve within said second master cylinder.

19. The brake for a motorcycle according to claim 18, and further including a spring for biasing said first and second valve guides to a position for normally maintaining said valve in an open condition.

20. The brake for a motorcycle according to claim 11, wherein said first link and said second link are substantially triangular in shape.

* * * * *